United States Patent [19]

Suzuki et al.

[11] Patent Number: 5,181,420
[45] Date of Patent: Jan. 26, 1993

[54] HOT WIRE AIR FLOW METER

[75] Inventors: Masayoshi Suzuki, Hitachiota; Masuo Akamatsu, Katsuta, both of Japan

[73] Assignee: Hitachi, Ltd., Tokyo, Japan

[21] Appl. No.: 537,772

[22] Filed: Jun. 14, 1990

[30] Foreign Application Priority Data

Jun. 14, 1989 [JP] Japan .................... 1-149658

[51] Int. Cl.$^5$ ............................... G01F 1/68
[52] U.S. Cl. ..................... 73/204.15; 73/204.18
[58] Field of Search ............ 73/204.15, 204.18, 204.19

[56] References Cited

U.S. PATENT DOCUMENTS

| | | | |
|---|---|---|---|
| 4,311,042 | 1/1982 | Hosoya et al. | 73/204.18 X |
| 4,400,974 | 8/1983 | Nishimura et al. | 73/204.15 X |
| 4,523,462 | 6/1985 | Kolodjski | 73/204.18 X |
| 5,036,702 | 8/1991 | Akamatsu et al. | 73/204.18 X |

FOREIGN PATENT DOCUMENTS 64-88218  4/1989  Japan .

*Primary Examiner*—Herbert Goldstein
*Attorney, Agent, or Firm*—Antonelli, Terry, Stout & Kraus

[57] ABSTRACT

The present specification discloses a hot wire air flow meter with high circuit stability. The hot wire type air flow meter comprises a hot wire located in an air flow path to be measured and to which current is supplied from the external, a circuit for detecting a value of current flowing through the hot wire, an amplifying circuit including an inverting input terminal, a non-inverting input terminal to which a value detected in the current detecting circuit is applied, and an output terminal to which an output of an air-flow function is applied, a feedback circuit for supplying a feedback output to any terminal except the non-inverting input terminal of the amplifying circuit and controlling the output of the amplifying circuit to keep the temperature of the hot wire stable according to the output of the amplifying circuit, and a circuit for compensating for a phase of an output of the amplifying circuit contained in the feedback circuit.

18 Claims, 7 Drawing Sheets

F I G. 2
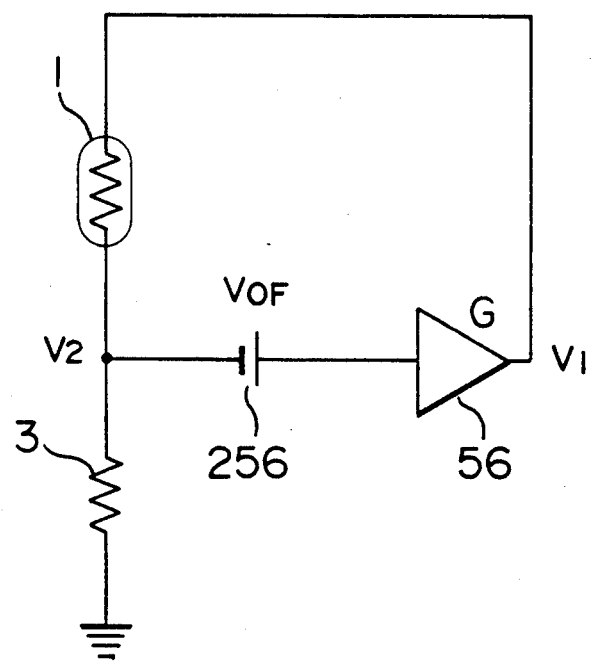

HOT WIRE AIR FLOW METER

BACKGROUND OF THE INVENTION

The present invention relates to a control circuit for a constant temperature type hot wire air flow meter.

FIG. 1 is a circuit diagram showing one example of the conventional constant temperature type hot wire air flow meter. In the circuit, 1 denotes a hot wire made of platinum or the like. The hot wire 1 is controlled to be a constant temperature by a circuit consisting of operational amplifiers 5, 6, a transistor 7 and resistors 3, 9, 21, 22. Air flow directed at the hot wire 1 results in a change in its resistance value. To cope with the change, the circuit serves to control the resistance value to be constant (the constant resistance value means a constant temperature). At a given time, a voltage is generated across resistor 3. This voltage represents a function of the air flow rate so that it can be used to produce a signal which is a measure of the air flow rate. A resistor 2 is a cold wire used for compensating for the temperature of the air to be measured.

FIG. 2 is an equivalent circuit of an air flow meter shown in FIG. 1. Resistors 1 and 3 in FIG. 2 are arranged in the same manner as those shown in FIG. 1. An amplifier 56 is an equivalent amplifying circuit composed of operational amplifiers 5, 6, resistors 2, 9, 21, 22 and the like. A voltage 256 is a d.c. voltage value defined by the circuit arrangement. This value is an index representing how much the circuit operation shifts out of a linear operation. It can be represented as follows (this value is referred to as a general offset voltage).

$$V_1 = (V_2 + V_{OF})G_2 \quad (1)$$

wherein $V_2$ is a voltage which appears at a branch point between the resistors 1 and 3, $V_1$ is an output of the amplifier 56, and G is a gain of the amplifier 56.

Further, the voltages $V_1$ and $V_2$ have the following relation;

$$V_2 = R_3/(R_1+R_3) \cdot V_1 \quad (2)$$

From the equations (1) and (2), the voltages $V_1$ and $V_2$ can be derived as follows.

$$V_1 = \frac{G}{1 - \frac{R_3}{R_1 + R_3} \cdot G} \times V_{OF} \quad (3)$$

$$V_2 = \frac{G}{1 - \frac{R_3}{R_1 + R_3} \cdot G} \times \frac{R_3}{R_1 + R_3} \times V_{OF} \quad (4)$$

As will be understood from the equations (3) and (4), no value of $V_1$ and $V_2$ can be provided without a value of $V_{OF}$.

That is, the subject circuit provides a general offset voltage $V_{OF}$, that is, an element defining the circuit operation in itself. By designing this value properly, the air flow meter reaches an optimum operation.

The value of $V_{OF}$ is defined by an input offset voltage $V_{OPF}$ of the operational amplifiers 5 and 6, resistors 24 and 28, a voltage $V_{CC}$ and the like. To keep the value of $V_{OF}$ constant, an external circuit composed of resistors 24, 28 and the like may be employed.

Even if the external circuit is used for keeping the value of $V_{OF}$ constant, this value will inevitably vary because it is subject to various factors such as temperature and power supply voltage level. In particular, since $V_3^{OF_2}$ is likely to be affected by the temperature and since the temperature is likely to vary widely, the value of $V_{OF}$ under certain conditions may become zero or lower than zero. This results often in a disabling of the circuit shown in FIG. 1 as an air flow meter; bringing it into an oscillating state.

One example of the conventional hot wire air flow meter has been disclosed in the Un-examined Patent Publication JP-A-64-8828 of the Japanese Application Serial No. 62-244096 Hitachi, Ltd., filed on Nov. 30, 1987.

SUMMARY OF THE INVENTION

It is therefore an object of the invention to provide a control circuit for controlling an air flow meter, which control circuit can be operated stably even if the general offset voltage $V_{OF}$ becomes zero or less than zero.

To achieve the foregoing object, the control circuit includes a phase compensating circuit and a feedback circuit which is effective for stabilizing the input offset voltage $V_{OF}$ of the operational amplifier which would be otherwise amplified by the control circuit itself.

The combination of the phase compensating circuit and the feedback circuit functions to stabilize the control circuit in processing a signal representing an air flow rate. It is, therefore, expected that the control circuit operates stably without entering a state of oscillation when the offset voltage $V_{OF}$ is 0 V or less than 0 V.

This stable operation of the control circuit is the result of two causes, that is, allowing the phase compensating circuit to compensate for a signal phase and stabilizing the offset voltage $V_{OF}$ defined by the control circuit, which voltage would be otherwise amplified by the circuit itself.

BRIEF DESCRIPTION OF THE DRAWINGS

FIG. 2 is a circuit diagram showing an equivalent circuit of the circuit shown in FIG. 1;

DESCRIPTION OF THE PREFERRED EMBODIMENTS

One embodiment of the present invention will be described with reference to FIG. 3. As shown, similar components to those of the prior art are referenced by similar numbers. A phase compensating circuit is composed of resistors 17, 18 and a capacitor 19 and serves to compensate for a phase of a flow rate signal in a specific time area (that is, a frequency area).

Figure 1:
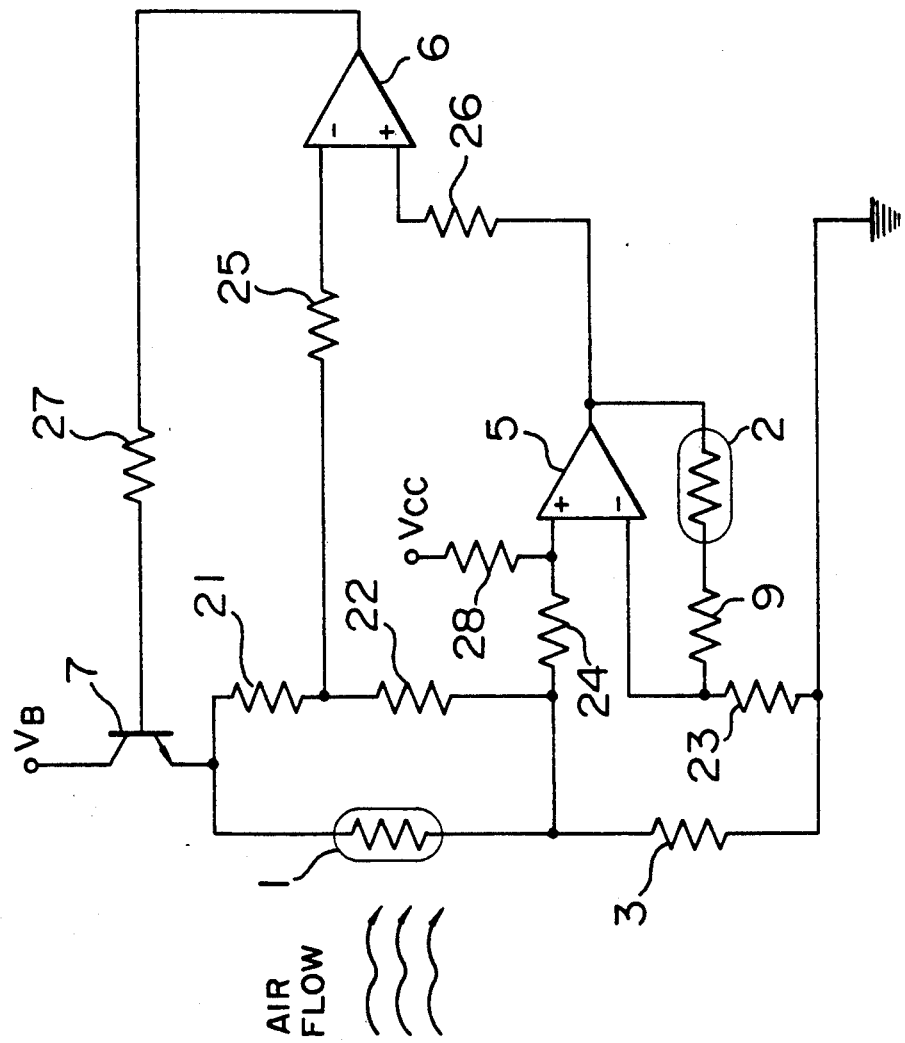
FIG. 1 is a circuit diagram showing a control circuit of a conventional hot wire air flow meter.

A feedback circuit for the operational amplifier 6 is composed of resistors 21 and 22. Unlike the feedback contact point at the end of resistor 22 as shown in FIG. 1, the feedback contact is not connected to a non-inverting input terminal (+) of the operational amplifier 5, but is connected to an inverting input terminal (−) thereof. In this connection, the control circuit itself does not function to amplify an input offset voltage $V_{OPF1}$ (d.c.

voltage between (+) and (−) input terminals) of the operational amplifier 5. It results in a stabilizing of the control circuit.

Figure 3:
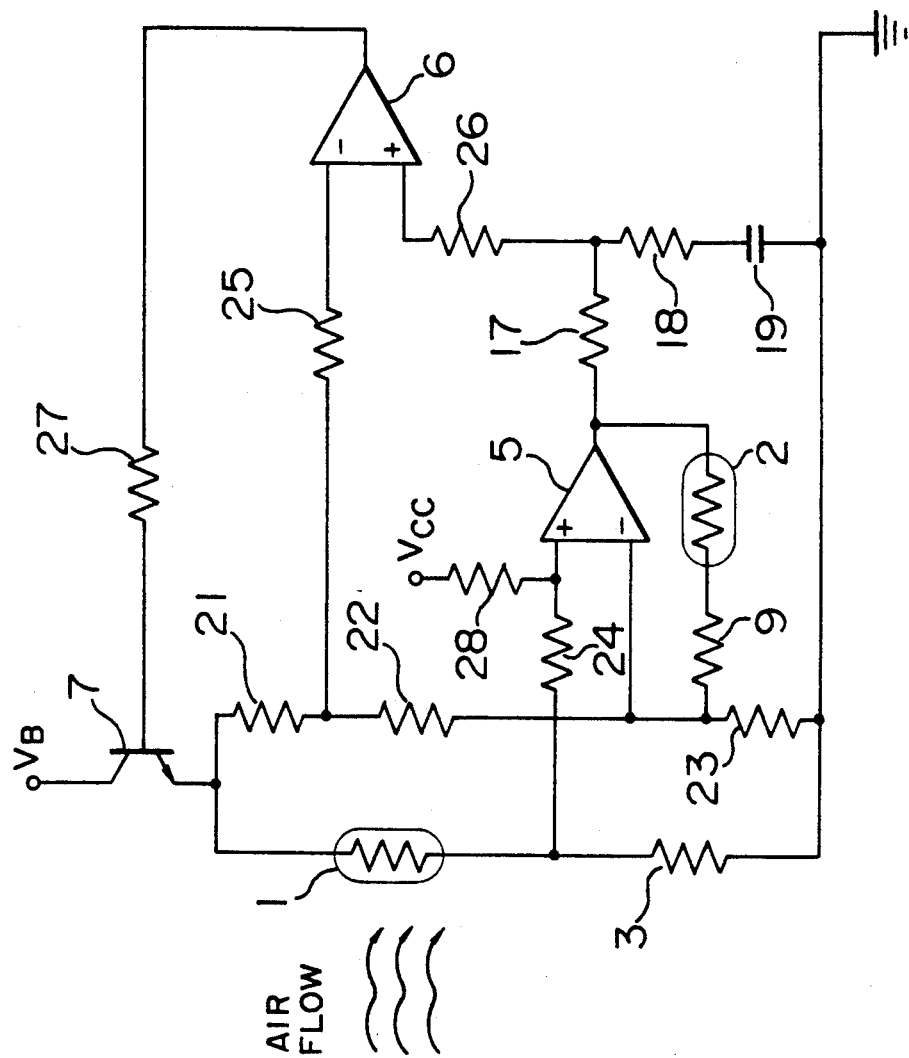
FIG. 3 is a circuit diagram showing a control circuit of an air flow meter.
Figure 4:
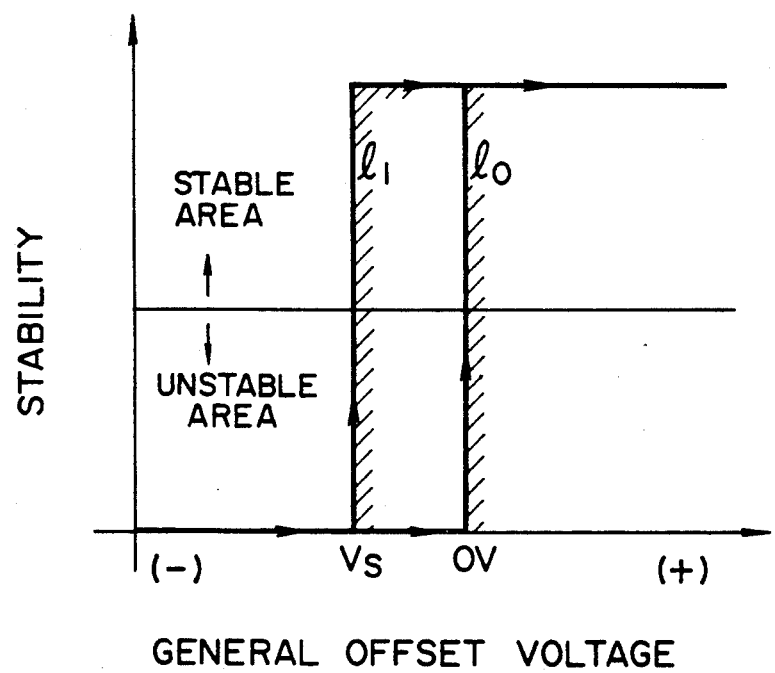
FIG. 4 is a graph showing the characteristics of the circuits shown in FIGS. 1 and 3.

FIG. 4 shows a characteristic of the embodiment shown in FIG. 3. In the characteristic graph, the x-axis represents the general offset voltage $V_{OF}$ and the y-axis represents stability of the sensor.

As will be understood from this graph, the conventional circuit shown in FIG. 1 has to keep a value of $V_{OF}$ as a proper value, because the circuit enters into an unstable area as shown by a curve $l_0$. However, the air flow meter shown in FIG. 3 employing the invention is designed to improve a stability curve as $l_1$ as shown in FIG. 4, because the air flow meter of this invention functions to apply a feedback signal to a non-inverting input terminal and to compensate for a phase of an output of the operational amplifier. As a result, there appears an area where the control circuit is stably operated even when the offset voltage $V_{OF}$ becomes negative. This function was found out by the present inventors.

Figure 5:
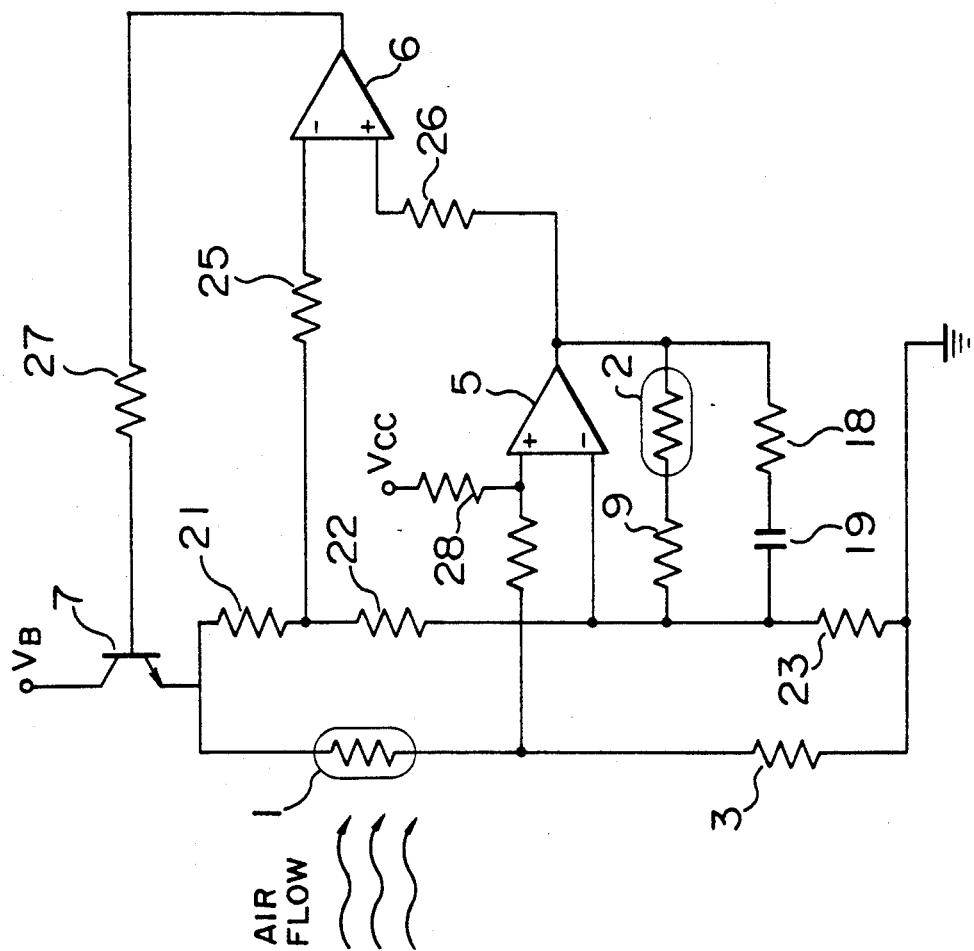
FIGS. 5, 6 and 7 are circuit diagrams showing an air flow meter according to other embodiments of the invention.

FIG. 5 shows another embodiment of the invention. According to this embodiment, the phase compensating circuit is composed of a resistor 18, a capacitor 19 and resistors 22, 23. This circuit arrangement is effective for replacing the function of the resistor 17 of the phase compensating circuit shown in FIG. 3 by the resistors 22 and 23. It results in reducing the number of resistors required in the circuit.

Figure 6:
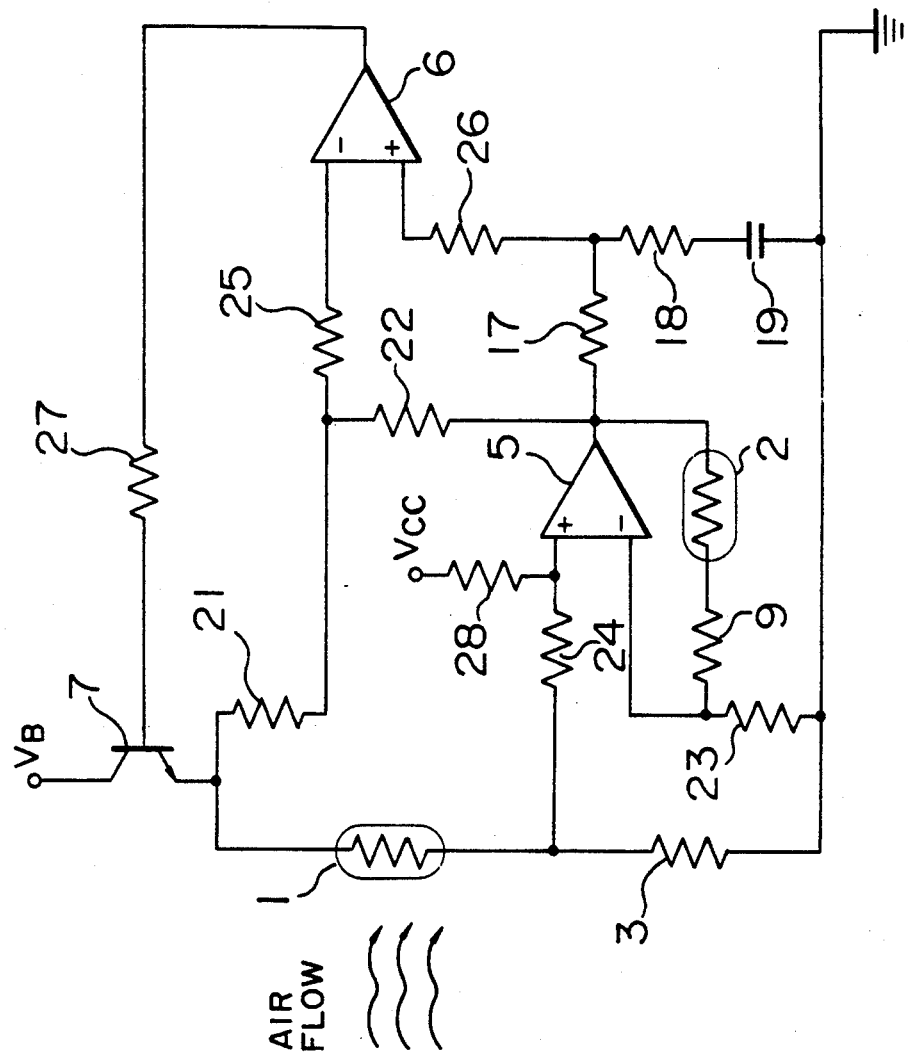

FIG. 6 shows another embodiment of the invention. In this embodiment, a resistor is connected to an output terminal of the operational amplifier 5. The operational amplifier provides so low a resistance value that the resistance values of the resistors 21, 22 and 23 can be easily designed.

Figure 7:
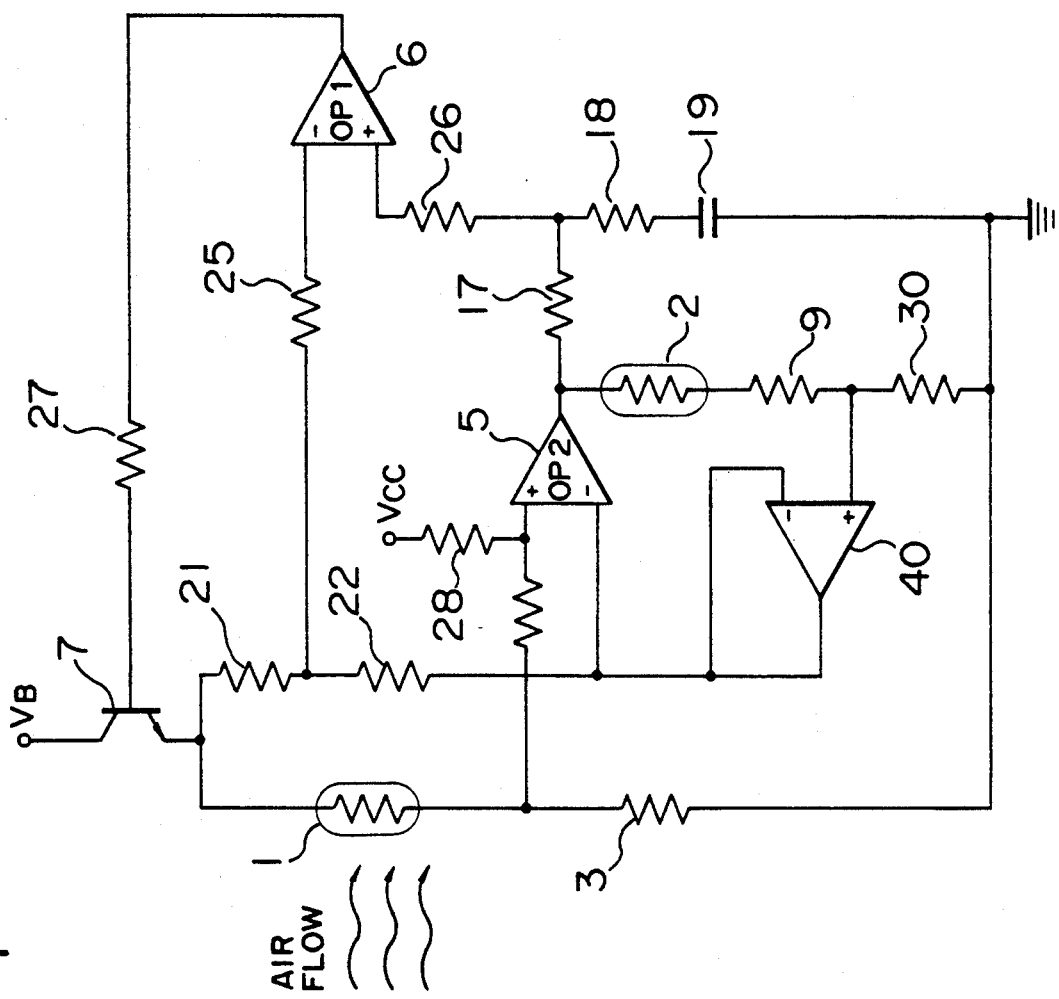

FIG. 7 shows the other embodiment of the invention. In this embodiment, an operational amplifier 40 is newly provided and has an output end to which one end of the resistor 22 is fed back. Further, this embodiment is designed to separate phase compensating circuits 17, 18 and 19 from feedback circuits 21, 22 through an operational amplifier 40 provided between the circuits 17, 18 and the resistors 21 and 22. Hence, it can offer more stability because no interference is caused between the compensating level given by the compensating circuit and the feedback level given by the feedback circuit.

According to the invention, the phase compensating circuit and the feedback circuit are compositely operated so as to treat a signal. It results in being able to operate the air flow meter stably even when the general offset voltage is negative.

We claim:

1. A hot wire type air flow meter, comprising:
    a hot wire to be located in an air flow path and to which a heating current is to be externally supplied;
    means connected to said hot wire for detecting a value of heating current flowing through said hot wire;
    amplifying means having an inverting input terminal (−), and a non-inverting input terminal (+) to which an output of said current detecting means is applied, for applying to an output terminal thereof a signal which is a function of air flow in the air flow path;
    feedback means connected to supply a feedback output related to said heating current to said inverting input terminal of said amplifying means for controlling the output of said amplifying means to keep the temperature of said hot wire constant according to the output of said amplifying means; and
    means connected to said amplifying means and isolated from said detecting means for compensating for a phase of an output of said amplifying means;
    wherein a buffer is provided between said feedback means and said compensating means.

2. A hot wire type air flow meter according to claim 1, further including a temperature compensating circuit having a thermal resistor to be located in said air flow path and responsive to an output of said amplifying means for compensating for a temperature of air to be measured.

3. A hot wire type air flow meter according to claim 2, wherein said phase compensating means is connected to the output terminal of said amplifying means.

4. A hot wire type air flow meter according to claim 2, wherein said phase compensating means is connected to said temperature compensating circuit.

5. A hot wire type air flow meter according to claim 2, wherein said feedback means comprises a voltage divider circuit which is connected to the inverting input terminal of said amplifying means.

6. A hot wire type air flow meter, comprising:
    a hot wire to be located in an air flow path;
    means for supplying a heating current to one end of said hot wire;
    means connected to the other end of said hot wire for detecting a value of heating current flowing through said hot wire;
    control means, including an amplifier having a non-inverting input terminal to which an output of said heating current detecting means is connected, an inverting input terminal, and an output terminal, for controlling said heating current supplying means to keep the temperature of said hot wire constant;
    feedback means connected to supply a current, which represents a level of said heating current, from said one end of said hot wire to said inverting input terminal of said amplifier;
    compensating means connected to the output terminal of said amplifier for compensating for a phase of an output of said amplifier;
    a temperature compensating circuit, having a thermal resistor to be located in said air flow path, connected between said output terminal of said amplifier and ground for compensating for the temperature of air to be measured.

7. A hot wire type air flow meter according to claim 6, wherein said heating current supplying means includes a control transistor for coupling a source of heating current to one end of said hot wire, and wherein said feedback means comprises a circuit including at least one resistor connected between said one end of said hot wire and said inverting input terminal of said amplifier.

8. A hot wire type air flow meter according to claim 7, wherein said feedback means comprise a series circuit of first and second non-thermal resistors.

9. A hot wire type air flow meter comprising:
    a hot wire to be located in an air flow path;
    means for supplying a heating current to said hot wire, including a control transistor for coupling a source of heating current to one end of said hot wire;

means connected to said hot wire for detecting a value of heating current flowing through said hot wire;

control means, including an amplifier having a non-inverting input terminal to which an output of said heating current detecting means is connected, an inverting input terminal, and an output terminal, for controlling said heating current supplying means to keep the temperature of said hot wire constant;

feedback means, including a series circuit of first and second resistors, connected to supply a current, which represents a level of said heating current, to said inverting input terminal of said amplifier;

compensating means connected to said amplifier for compensating for a phase of an output of said amplifier; and wherein said control means comprises a further amplifier having an inverting input terminal connected to a point of connection of said first and second resistors, a non-inverting input terminal connected to an output terminal of the first-mentioned amplifier and an output terminal connected to a control electrode of said control transistor.

10. A hot wire type air flow meter according to claim 9, wherein compensating means, which comprises a circuit including at least one resistor and a capacitor, is connected between said output terminal of said amplifier and ground.

11. A hot wire type air flow meter according to claim 10, further including a temperature compensating circuit, having a thermal resistor to be located in said air flow path, connected between said output terminal of said amplifier and ground for compensating for the temperature of air to be measured.

12. A hot wire type air flow meter according to claim 11, wherein said compensating means is connected to said temperature compensating circuit.

13. A hot wire type air flow meter according to claim 11, wherein said compensating means is connected in parallel with said temperature compensating circuit.

14. A hot wire type air flow meter according to claim 9, further including a temperature compensating circuit, having a thermal resistor to be located in said air flow path, connected between said output terminal of said amplifier and ground for compensating for the temperature of air to be measured.

15. A hot wire type air flow meter comprising:
a hot wire to be located in an air flow path;
means for supplying a heating current to said hot wire;
means connected to said hot wire for detecting a value of heating current flowing through said hot wire;
control means, including an amplifier having a non-inverting input terminal to which an output of said heating current detecting means is connected, an inverting input terminal, and an output terminal, for controlling said heating current supplying means to keep the temperature of said hot wire constant;
feedback means connected to supply a current, which represents a level of said heating current, to said output terminal of said amplifier; and
compensating means connected to said amplifier for compensating for a phase of an output of said amplifier; and
wherein said heating current supplying means includes a control transistor for coupling a source of heating current to one end of said hot wire, and wherein said feedback means comprises a series circuit of first and second resistors connected between said one end of said hot wire and said output terminal of said amplifier.

16. A hot wire type air flow meter according to claim 15, wherein said control means comprises a further amplifier having an inverting input terminal connected to a point of connection of said first and second resistors, a non-inverting input terminal connected to an output terminal of the first-mentioned amplifier and an output terminal connected to a control electrode of said control transistor.

17. A hot wire type air flow meter according to claim 15, wherein said compensating means comprises a circuit including at least one resistor and a capacitor connected between said output terminal of said amplifier and ground.

18. A hot wire type air flow meter according to claim 17, further including a temperature compensating circuit, having a thermal resistor to be located in said air flow path, connected between said output terminal of said amplifier and ground for compensating for the temperature of air to be measured.

* * * * *